(12) United States Patent
Bradford

(10) Patent No.: US 8,454,781 B2
(45) Date of Patent: *Jun. 4, 2013

(54) METHOD OF MAKING MULTILAYER PRODUCT HAVING HONEYCOMB CORE OF IMPROVED STRENGTH

(75) Inventor: Judson A. Bradford, Holland, MI (US)

(73) Assignee: Bradford Company, Holland, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/085,923

(22) Filed: Apr. 13, 2011

(65) Prior Publication Data

US 2012/0261061 A1 Oct. 18, 2012

(51) Int. Cl.
*B31D 3/02* (2006.01)
*B29C 47/00* (2006.01)

(52) U.S. Cl.
USPC . 156/201; 156/210; 156/244.18; 156/244.25; 156/252; 156/257

(58) Field of Classification Search
None
See application file for complete search history.

(56) References Cited

U.S. PATENT DOCUMENTS

| | | | |
|---|---|---|---|
| 2,668,327 A | 2/1954 | Steele | |
| 3,037,592 A | 6/1962 | Shipley et al. | |
| 3,684,618 A | 8/1972 | Geschwender | |
| 3,887,418 A | 6/1975 | Jurisich | |
| 4,197,341 A | 4/1980 | Rule | |
| 5,132,156 A | 7/1992 | Trassare, Jr. et al. | |
| 5,252,163 A | 10/1993 | Fell | |
| 5,389,059 A | 2/1995 | Corwin | |
| 5,549,773 A | 8/1996 | Henderson et al. | |
| 6,183,836 B1 | 2/2001 | Pflug | |
| 6,387,200 B1 | 5/2002 | Ashmead et al. | |
| 6,726,974 B1 | 4/2004 | Pflug et al. | |
| 6,800,351 B1 | 10/2004 | Pflug et al. | |
| 8,303,744 B2 * | 11/2012 | Bradford | 156/201 |
| 2008/0075916 A1 | 3/2008 | Bradford | |
| 2008/0131654 A1* | 6/2008 | Bradford et al. | 428/118 |
| 2008/0176027 A1* | 7/2008 | Pflug et al. | 428/116 |
| 2010/0055387 A1 | 3/2010 | Bradford | |
| 2010/0078985 A1 | 4/2010 | Mahoney et al. | |

FOREIGN PATENT DOCUMENTS

| | | |
|---|---|---|
| DE | 19716637 A1 | 10/1998 |
| FR | 1509018 | 1/1968 |
| JP | 56-150534 A * | 11/1981 |
| WO | 97/03816 | 2/1997 |
| WO | 2006/053407 A1 | 5/2006 |

OTHER PUBLICATIONS

K.U. Leuven Dept. MTM, Maschinenfabrik Meyer, Project Page, "Composite Materials Group", (no date), 1 page.
Pflug et al., Jochen, K.U. Leuven Dept. MTM, "Continuously Produced Honeycomb Cores", (no date), 10 pages.
http://www.mtm.kuleuven.ac.be/Research/C2/poly/TORHex.htm, "Composite Materials Group", "TorHex Projects", (2004), 6 pages.

(Continued)

*Primary Examiner* — Barbara J Musser

(74) *Attorney, Agent, or Firm* — Wood, Herron & Evans, LLP

(57) ABSTRACT

A process of making a multilayered product having an interior honeycomb layer or core. The interior layer is formed by extruding a generally corrugated web of material. The corrugated web is cut and folded to create the honeycomb core. Outer protective skins are applied to exterior surfaces of the interior layer to create a multilayered material which is then cut to size.

20 Claims, 15 Drawing Sheets

OTHER PUBLICATIONS

Pflug et al, Jochen, K.U. Leuven Dept. Mechanical Engineering, "Thermoplastic Folded Honeycomb Cores—Cost Efficient Production of All Thermoplastic Sandwich Panels", (no date) 8 pages.
http://www.kp.dlr.de/EUREKKA/FACTORY/publications.htm, Eureka EU 1440 Factory, "E! 2796 Factory Thermhex—New Thermoplastic Honeycomb Sandwich Core Material for Structural Applications", (Sep. 9, 2005), 6 pages.

Pflug et al Jochen, "Folded Honeycomb Cardboard and Core Material for Structural Applications", Sandwich Construction 5, EMAS 1999, 12 pages.
Pflug et al., Jochen, K.U. Leuven, Dept. MTM, "New Sandwich Material Concepts—Continuously Produced Honeycomb Cores", Composites in Transport Network, Oct. 2, 2003, 32 pages.

* cited by examiner

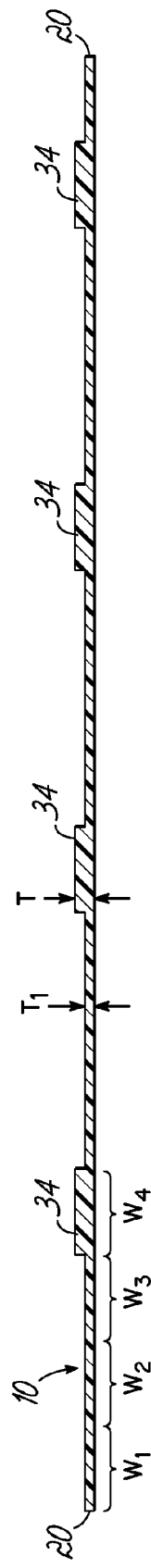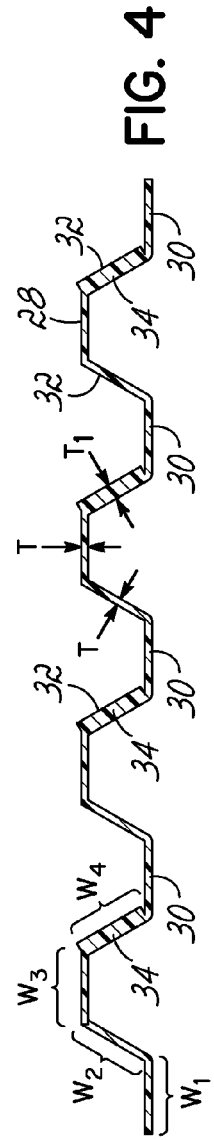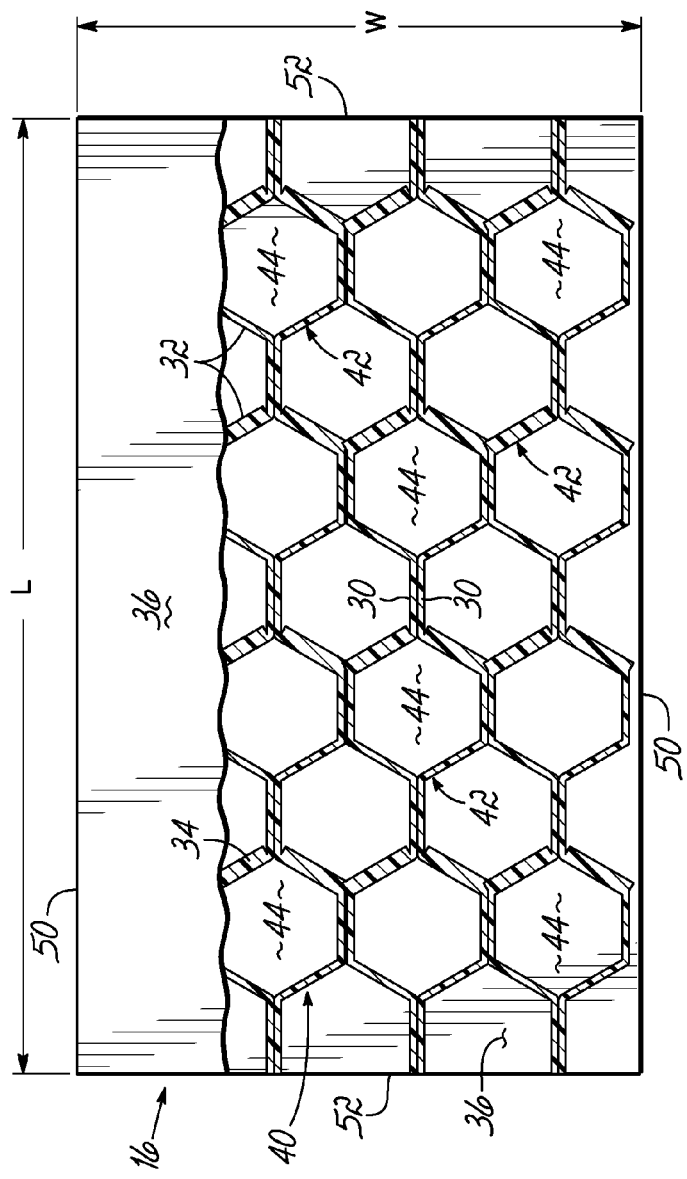

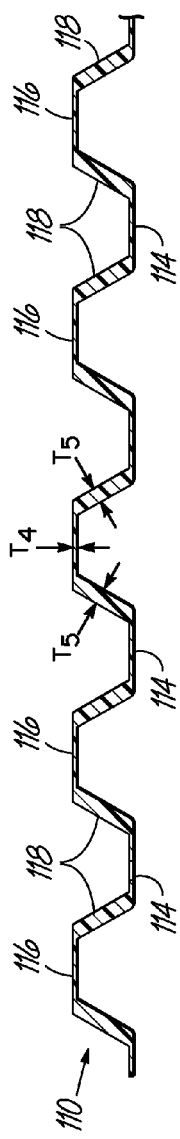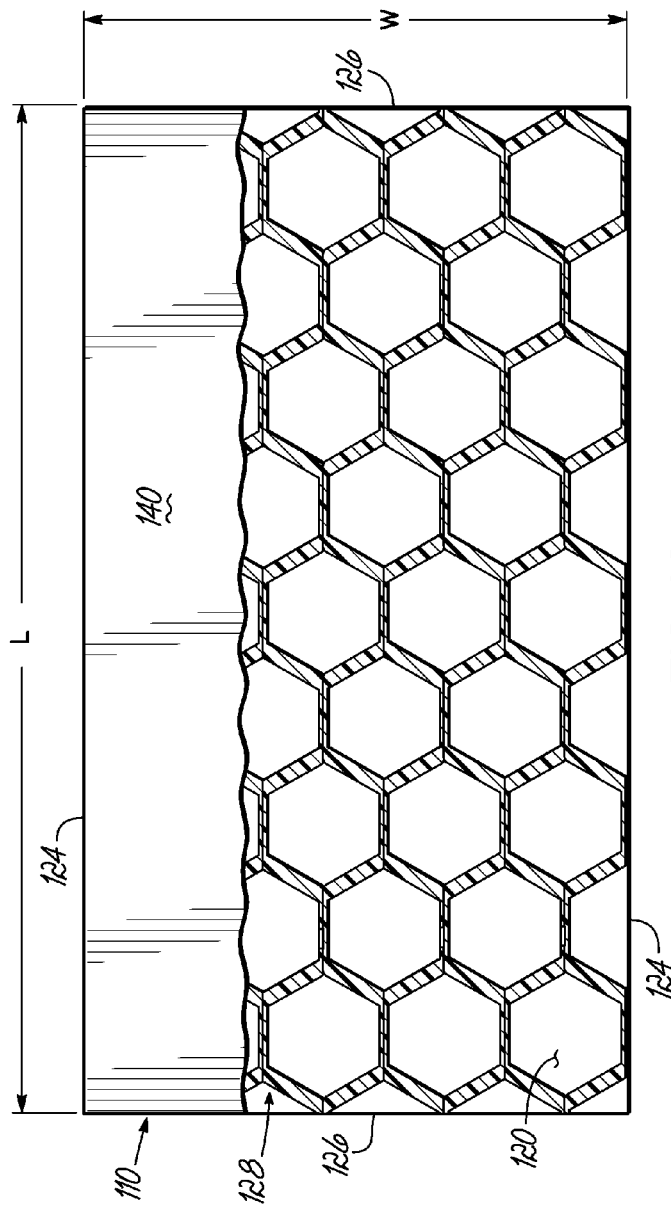

METHOD OF MAKING MULTILAYER PRODUCT HAVING HONEYCOMB CORE OF IMPROVED STRENGTH

FIELD OF THE INVENTION

This invention relates generally to a product for structural, packaging, and other applications and the process of making the product.

BACKGROUND OF THE INVENTION

In the aerospace industry, honeycomb products have been used as a core component for sandwich panels and boards that are resistant to buckling and bending. These honeycomb products each comprise a plurality of cells which, in cross-section, have a generally hexagonal shape. Such products may be fabricated from aluminum, fiber paper or plastic, among other materials. A sandwich structure may be prepared having two cover layers or skins which are welded, adhesively bonded or otherwise secured to the honeycomb product to create a multilayered or multi-laminate material. Interest expressed in other industrial sectors concerning the use of lightweight sandwich structures is continually growing, due at least in part to the realization of its high strength properties while maintaining a relatively low structural weight per volume of product.

A multilayered or multi-laminate material having a honeycomb product as the core thereof may be used in the packaging industry. However, in automobile part packaging and comparable markets, such a product must compete with corrugated paperboard or corrugated plastic or like materials which may be produced quickly and relatively inexpensively.

U.S. Pat. No. 6,183,836 discloses a honeycomb core for use in a sandwich material in which the material of the honeycomb core is cut and then folded to create a plurality of hexagonal cells. Due to the process used to make the honeycomb product, including the complex folding of the cut sheet, the resultant structure may be expensive to manufacture.

A process for producing a folded honeycomb core for use in sandwich materials from a continuous uncut web is disclosed in U.S. Pat. No. 6,726,974. U.S. Pat. No. 6,800,351 discloses another process for producing a folded honeycomb core which includes scoring a corrugated material before rotating interconnected corrugated strips. The honeycomb core resulting from using either of these methods may have material which adds to the weight of the honeycomb core, but may not significantly improve the strength of the honeycomb core.

Regardless of which method is used to manufacture a honeycomb core, the resultant core may have a compressive strength in one direction which is higher than the compressive strength in another direction. Often the compressive strength in one direction is higher due to several layers of the material being overlapped; all the overlapped portions extending in the same direction. Accordingly, there is a need for a multilayered product which has an interior honeycomb layer having equal strengths in multiple directions.

There is further a need for a process for manufacturing a product, such as a honeycomb product, for use in a multilayered material which is less expensive and more efficient than heretofore known processes.

SUMMARY OF THE INVENTION

The present invention comprises a process for producing a sandwich-like or multilayered product having an interior layer, including a honeycomb core. The invention also includes the resultant product made by the method(s). The product may have any number of layers; the product is not intended to be limited to three layers. The processes of the present invention may be used to make products for use in any desired environment or industry, including but not limited to, packaging materials.

According to one aspect of this invention, a process of making a multilayered product comprises moving a web of material in a first direction. The web of material has a cross-section of regions of varying thickness, the regions extending in the first direction. These regions of increased thickness compared to other portions or regions of the web may be any desired width and/or height. The web or webs may be heated to any desired temperature and of any desired widths at the start of the process and at any stage in the process. In addition, the web or webs may be any desired material including, but not limited to, plastic.

The next step comprises treating the web of material with a tool to produce a corrugated web of material having a generally corrugated profile with interrupted flattened peaks and flattened valleys joined by connecting portions of the web, the flattened peaks and flattened valleys extending in the first direction or direction of travel of the web. An additional step comprises folding the corrugated web to create a honeycomb core. Another step comprises applying or securing outer skins to the honeycomb core. In order to obtain a product of a desired size, the last step in the process may comprise cutting the multilayered material, including the honeycomb core and the outer skins to create the finished product.

According to another aspect of the invention, the process comprises making a multilayered product, including an interior layer having a honeycomb core. The process includes applying outer skins to the interior layer and cutting the combined layers to a desired size. The process of making the interior layer comprises extruding a web of material in a first direction. The web has a generally corrugated profile with continuous flattened peaks and flattened valleys joined by connecting portions of the web, the flattened peaks and flattened valleys extending in the direction of travel of the web. The next step in the process comprises cutting the continuous corrugations of the corrugated web. The next step in the process comprises folding the corrugated web to create a honeycomb core. Another step in the process comprises applying outer skins to the honeycomb core.

According to another aspect of the invention, the process comprises making a multilayered product, including an interior layer having a honeycomb core. One step in the process comprises extruding a web of material to produce a corrugated web of material having continuous flattened peaks and flattened valleys joined by connecting portions of the web. The flattened peaks and flattened valleys extend in the direction of travel of the web. Another step in the process comprises cutting portions of the corrugated web. Another step in the process comprises folding the corrugated web to create a honeycomb core. Another step in the process comprises applying outer skins to the honeycomb core.

According to another aspect of the invention, the extrudate is shaped so that some of the connecting portions of the continuous corrugations are thicker than the peaks or valleys of the continuous corrugations due to the configurations of the extruder. Alternatively or additionally, some of the connecting portions of the continuous corrugations are thicker than other of the connecting portions of the continuous corrugations due to the configuration of the extruder.

Regardless of the method used to create the multilayered product, one advantage of the process is that a lightweight, strong product having a large strength-to-weight ratio may be quickly and easily manufactured in a desired size or height. The product of this invention, which may be produced according to any of the processes described herein, has a relatively high strength-to-weight ratio, and may be made from many different materials quickly and inexpensively. The strength-to-weight ratio may be improved by strategic removal of material from the web at some time in the process of fabricating the product. The multilayered product may be incorporated into any desired product, or used in any desired manner.

BRIEF DESCRIPTION OF THE DRAWINGS

The objectives and features of the present invention will become more readily apparent when the following detailed description of the drawings is taken in conjunction with the accompanying drawings in which:

FIG. 3 is a cross-sectional view taken along the line 3-3 of FIG. 1;

FIG. 4 is a cross-sectional view taken along the line 4-4 of FIG. 2;

FIG. 5 is a top plan view, partially cut away, of a product made using the method of FIGS. 1 and 2;

FIG. 15 is a cross-sectional view of an alternative configuration of web which may be formed using any of the methods described herein;

FIG. 16 is a top plan view of an alternative embodiment of product having a honeycomb core made from the web of FIG. 15;

DETAILED DESCRIPTION OF THE DRAWINGS

Figure 1:
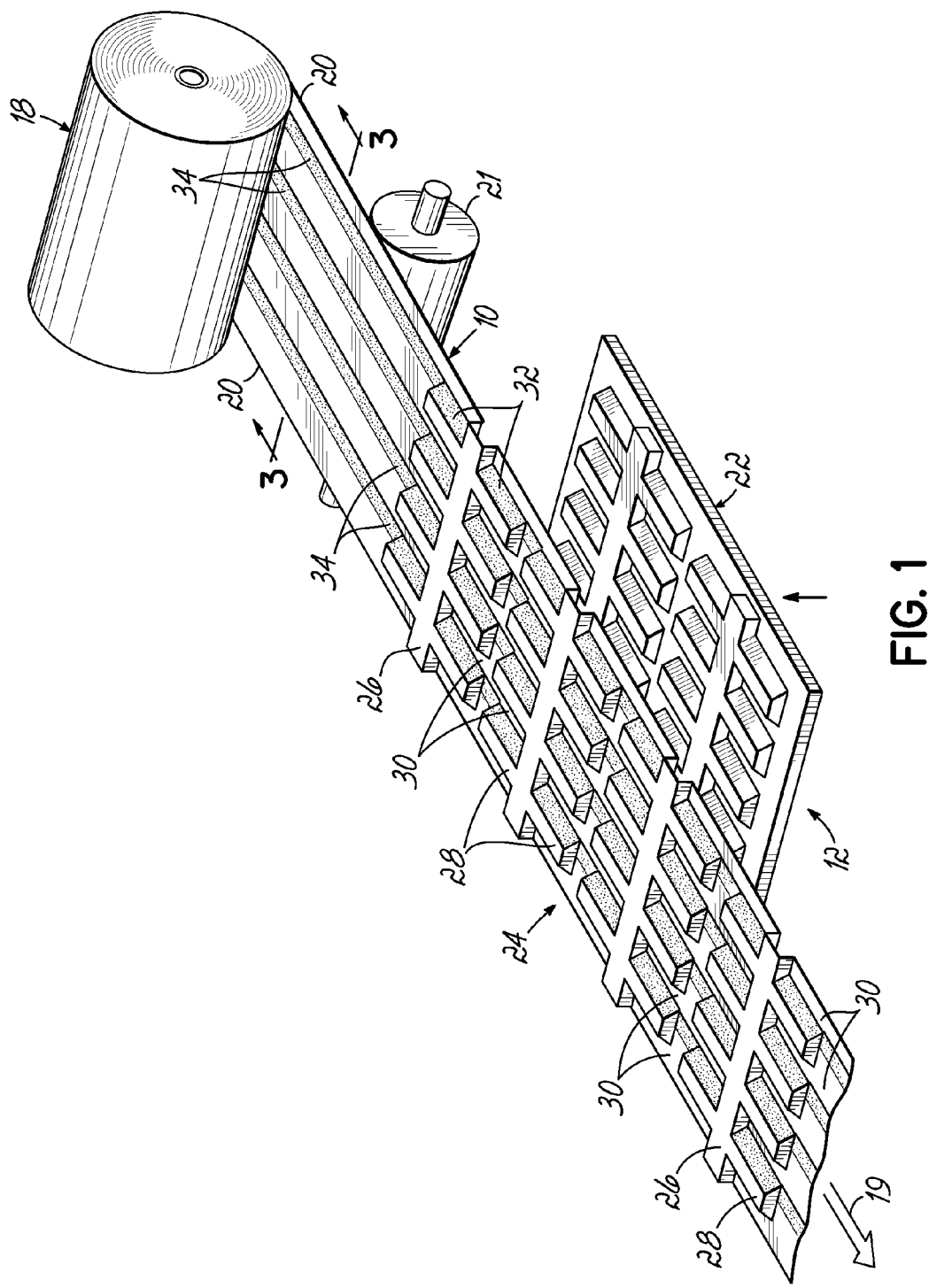
FIG. 1 is a perspective view of a web of material being unrolled and treated by a movable thermoforming tool.
Figure 2:
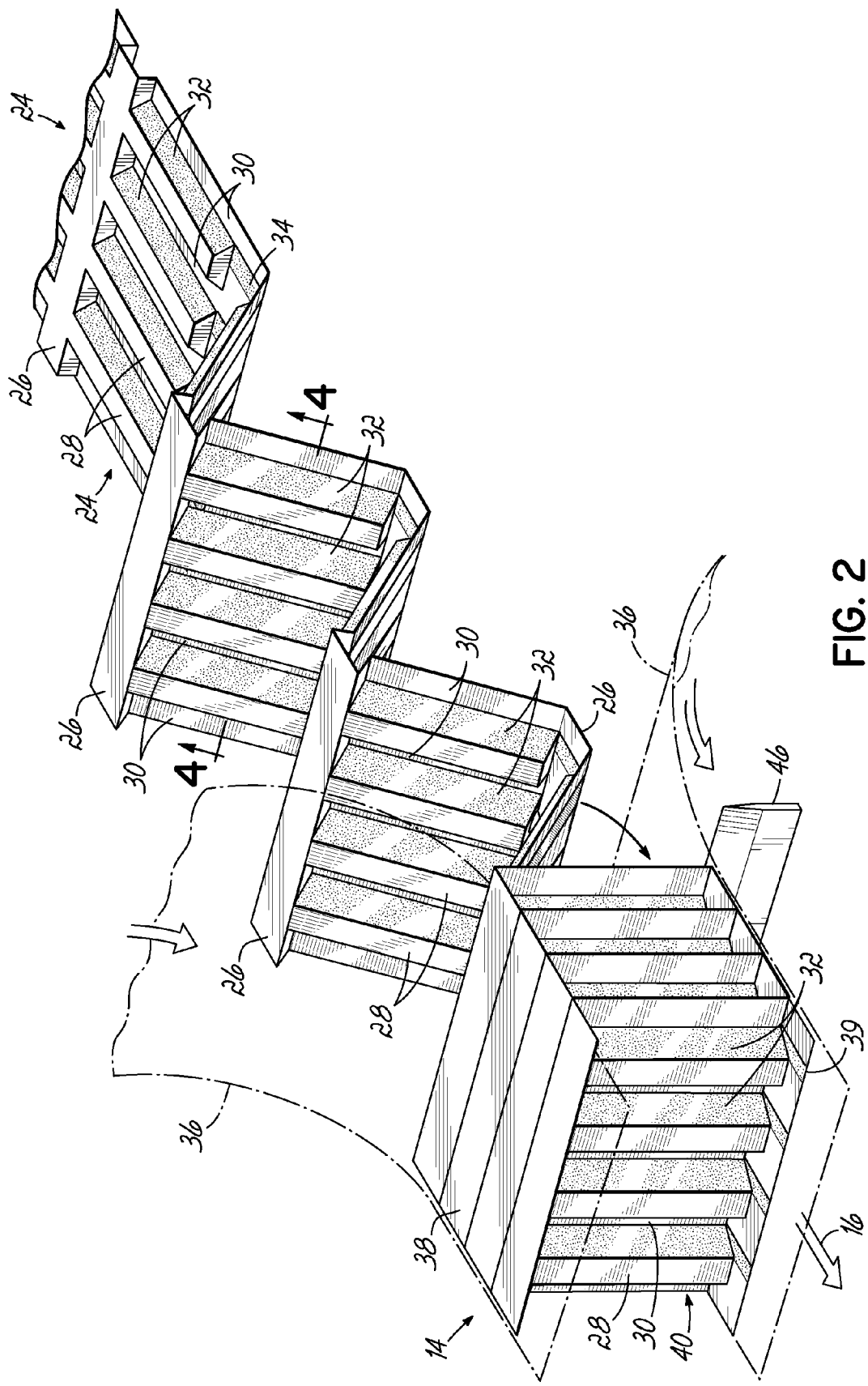
FIG. 2 is a perspective view of the thermoformed or corrugated web of material of FIG. 1 being folded and outer skins being applied to the folded web.

Referring to the drawings and, particularly to FIGS. 1 and 2, a flexible web or membrane of material 10 is shown entering an apparatus 12 for producing a continuous flow of multilayered or sandwich-like material 14 which is cut to size to produce a finished multilayered product 16 shown in FIG. 5. The web of material 10 may come from any source including, but not limited to, a roll 18 shown in FIG. 1. Alternatively, the web 10 shown in cross-section in FIG. 3 may be stacked or otherwise stored. Once unwound or unrolled, the web of material 10 is generally flat. However, as shown in FIG. 3, web 10 is not planar; rather it has portions of differing thicknesses across its width, defined as the linear distance between its opposed edges 20. The web 10 is pulled or moved in the direction of arrows 19 in any conventional manner, including being helped by a rotational, moving roller 21 shown in FIG. 1. The direction of travel of the web 10 during this process is indicated by arrows 19, as shown in FIGS. 1 and 2. Although only one moving roller 21 is shown in FIG. 1, the web 10 may pass around or between several rollers before being treated or deformed by a movable tool 22, shown in detail in FIG. 2, into a generally corrugated shape as shown and described below.

The flexible web of material 10 may be solid or may have openings formed therethrough at any stage in the process, as illustrated and/or described in U.S. patent application Ser. No. 11/535,623, which is fully incorporated herein.

The next step in the process is to plastically deform or treat the web of material 10 with a movable tool 22, which may be cooled or heated to any desired temperature. Alternatively, the moving web of material 10 shown in FIG. 3 may be heated before being plastically deformed via the tool 22. Although only one tool 22 is illustrated, any number of similar tools may be used together or in any desired order at any desired temperature. Although one design or configuration is shown in the tool 22, other similar designs or generally corrugated patterns may be on tool 22 to impart generally corrugated designs onto the movable web 10.

After the web 10 has been plastically deformed into a generally corrugated web 24 by use of the tool 22, the generally corrugated web 24 is folded along the edges of the transversely extending flats 26 to create a continuous honeycomb core 40, as described in U.S. Pat. No. 6,726,974, which is fully incorporated by reference herein.

The configuration or shape of the tool 22 imparts a specific configuration to the web 10 passing downstream in the direction of arrows 19. As shown in FIGS. 1 and 2, the treatment or deformation caused by the tool 22 creates an uncut generally corrugated web 24 having a generally corrugated profile with interrupted (as opposed to continuous) flattened peaks 28 and flattened valleys 30 joined by connecting portions 32, all extending in the direction of travel of the web 10 shown by arrows 19. The tool 22 plastically deforms or shapes the unrolled web of material 10 from a generally flat orientation shown in FIG. 3 to a generally corrugated orientation having spaced flattened peaks 28 and flattened valleys 30 joined by connecting portions 32, all extending in the direction of travel of the web 10 shown by arrows 19 and interrupted by flats 26. See FIG. 4.

FIG. 3 shows a cross-section of the unrolled web 10 before it is treated with tool 22. The web 10 has a series of spaced, raised portions or regions 34 of increased thickness "T" compared to the thickness "$T_1$" of the remainder of the web 10. These raised portions 34 extend in the direction of travel 19 of the web 10 or longitudinally. The width W4 of each of the raised portions 34 is identical to the sum of three widths $W_1$, $W_2$ and $W_3$ as shown in FIG. 3. Therefore, when the web 10 shown in FIG. 3 is plastically deformed or treated as described herein and shown in FIGS. 1 and 2 to create the corrugated web 24 shown in FIG. 2, the corrugated web 24 has flattened valleys 28 and flattened peaks 30 of reduced thickness "$T_1$". Every other one of the connecting portions 32 has an increased thickness "T" greater than the thickness "$T_1$" of the peaks 30, valleys 28 and other connecting portions 32, as shown in FIG. 4.

As shown in FIG. 2, the next step in the process is applying or securing outer skins 36 (shown in phantom for clarity) to upper and lower surfaces 38, 39 of the folded continuous honeycomb core 40 in the direction of travel 19 of the web 10. As shown in FIGS. 1 and 2, this process described above with the steps being performed as described herein creates a continuous strip of material 14 having a sandwich-like or trilaminate composition, the outer skins 36 being outside and secured to the continuous interior layer 40. As shown in FIG. 5, the continuous interior layer 40 comprises a honeycomb core made up of honeycomb cells 42, each having a hollow interior 44, which reduces the weight of the final product 16 without compromising the strength of the product 16.

As illustrated in FIG. 2, the continuous multilayered material 14 may be cut to size via a cutter 46 to create a finished product 16. As shown in FIG. 5, the finished product 16 has a honeycomb interior layer 40 sandwiched between outer skins 36. Although one size product 16 is illustrated in FIG. 5, the product 16 may be any desired size, i.e., length, width and/or height.

FIG. 2 shows two outer or protective skins 36 being placed over and under the continuous honeycomb core 40 to create a three-layered continuous product 14. The outer skins 36 may be applied from rolls of material (not shown), or may be supplied in any known manner. The cutter or cutting device 46 shown in FIG. 2 cuts the three-layered continuous product 14 to a desired size having a longitudinal dimension or length L in the direction of travel of the materials and a transverse dimension or width W perpendicular to the direction of travel of the materials, as shown in FIG. 5. The result is a finished product 16 having a honeycomb interior layer 40 and outer skins 36. This process enables the product 16 to weigh less than comparable products having a solid honeycomb core without compromising strength or integrity.

FIG. 5 illustrates a finished multilayered product 16 made in accordance with the method shown in FIGS. 1-4 having a pair of opposed side edges 50, the distance between which defines the width W of the product 16. Similarly, product 16 has a pair of end edges 52, the distance between which defines the length L of the product 16. The product 16 has a middle layer or honeycomb core 48 covered on top and bottom with outer or protective skins or layers 36.

One of the results of having every other one of the connecting portions 32 of the corrugated web 24 thicker than the peaks 28 and valleys 30 of the corrugated web 24 (shown in FIGS. 1 and 2) is that the strength of the honeycomb core 40 of product 16 shown in FIG. 5 is the same in the transverse and longitudinal directions. As shown in FIG. 4, because the thickness of "T" of every other one of the connecting portions 32 of the corrugated web 24 is approximately the same as the thickness "$T_1$" of two peaks 28 or valleys 30 of the corrugated web 24 contacting each other, after the process of manufacture is completed, resulting in product 16, the strength of the honeycomb core 40 of product 16 is the same in both the transverse and longitudinal directions. This resulting product 16 is similar to the product(s) disclosed in U.S. patent application Ser. No. 13/024,838, which is fully incorporated herein.

Figure 6:
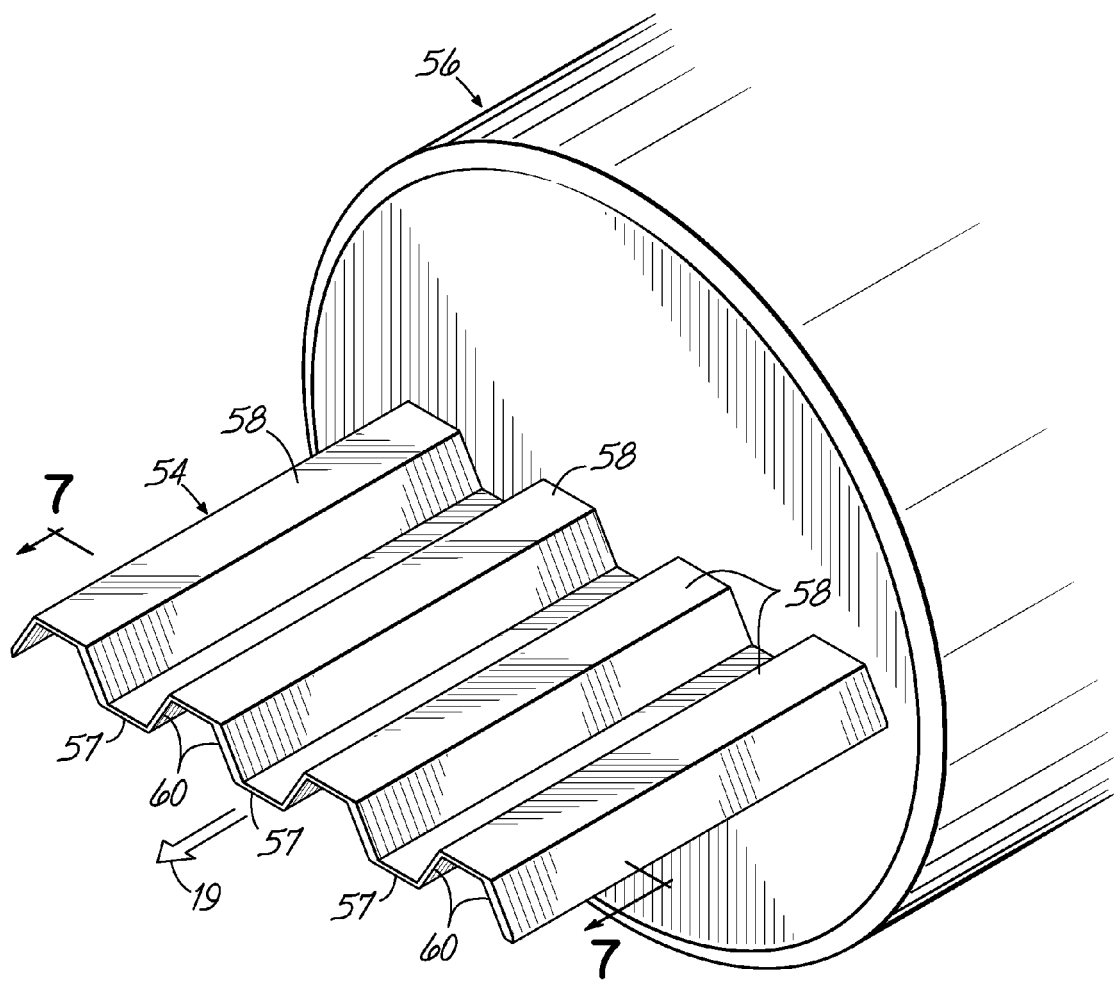
FIG. 6 is a perspective view of an extruder extruding a generally corrugated web for use in a honeycomb core.
Figure 7:
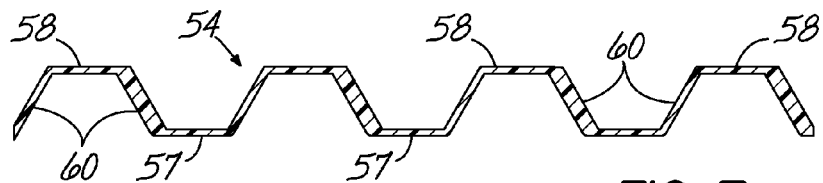
FIG. 7 is a cross-sectional view taken along the line 7-7 of FIG. 6.
Figure 7A:
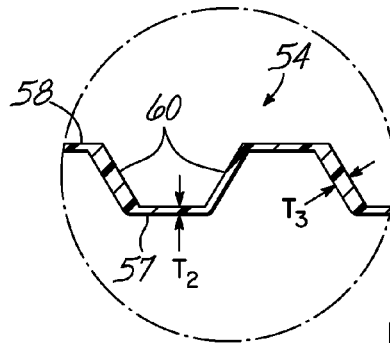
FIG. 7A is an enlarged view of a portion of FIG. 7.

Referring to FIG. 6, a flexible, generally corrugated web of material 54 is shown exiting an extruder 56. The flexible web of material 54 is similar, but not identical in configuration, as the corrugated web 24 shown in FIG. 4. The corrugations in the web 54 are continuous, rather than interrupted as they are in corrugated web 24 shown in FIGS. 1 and 2. As shown in FIGS. 7 and 7A, extruder 56 is specifically configured to produce a generally corrugated web or extrudate 54 having continuous flattened valleys 57 and flattened peaks 58 of the same thickness "$T_2$" and every other one of the connecting portions 60 being of an increased thickness "$T_3$", as shown in FIG. 7A. The thickness "$T_3$" is greater than the thickness "$T_2$".

Figure 8:
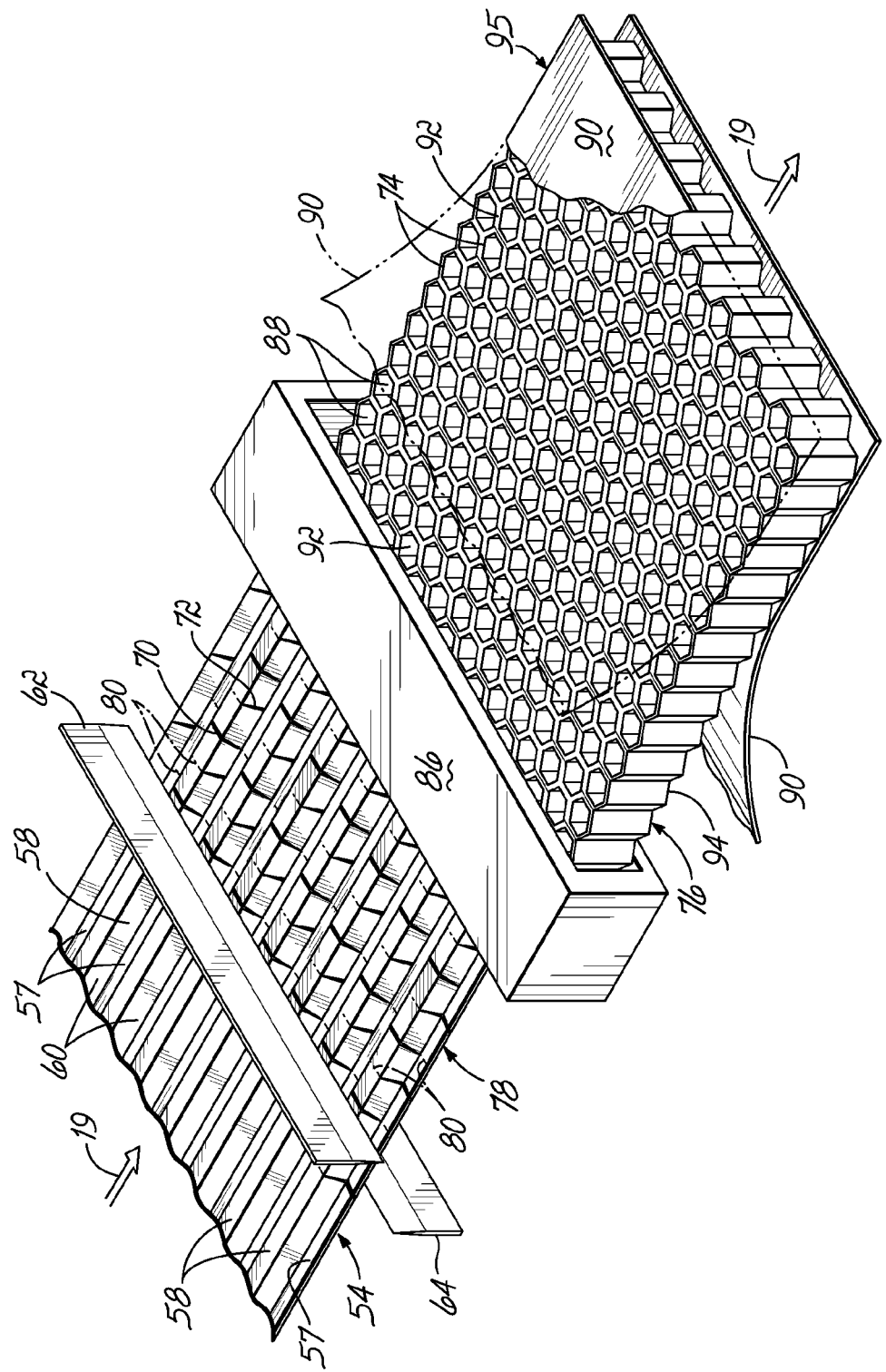
FIG. 8 is a perspective view of the extruded web of FIGS. 6 and 7 being cut and folded into a honeycomb core and outer skins being applied to the honeycomb core.
Figure 9:
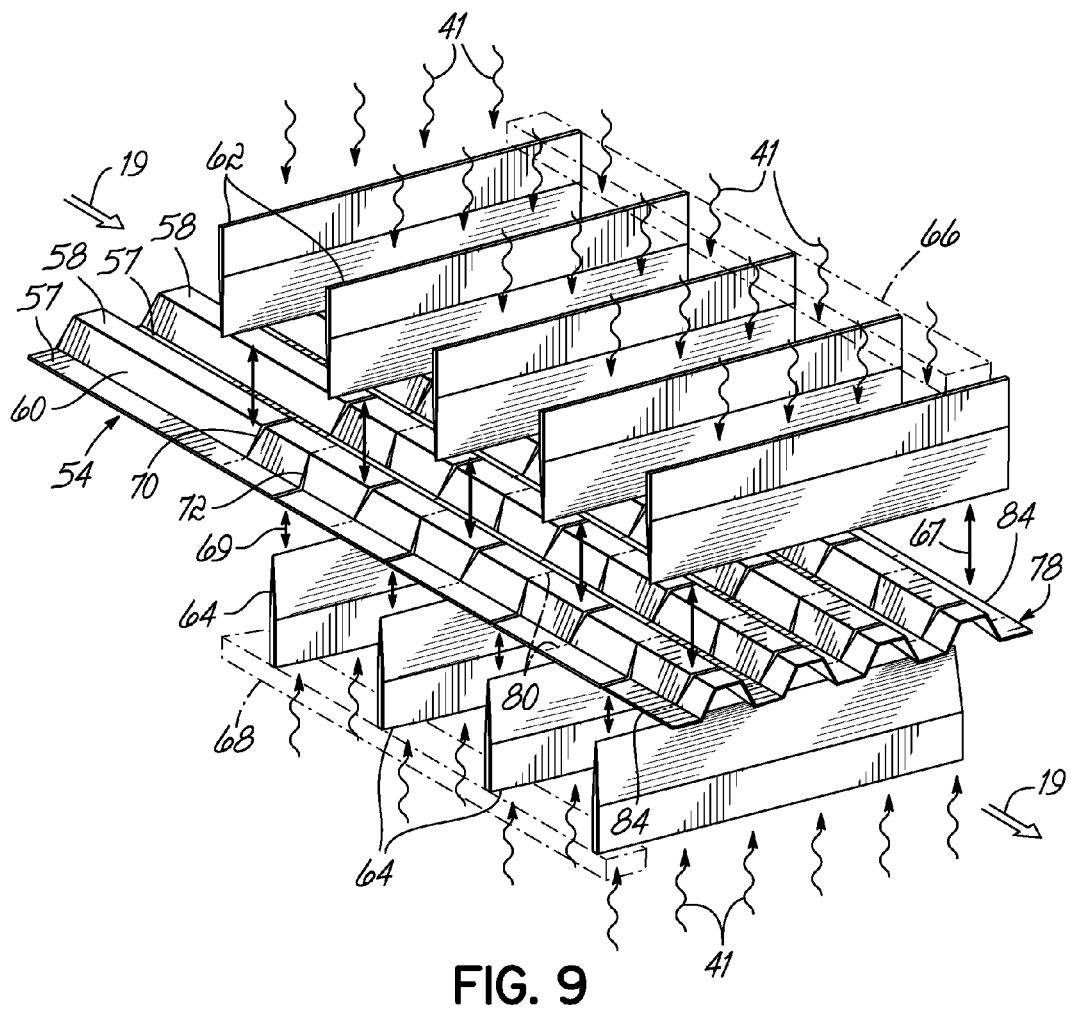
FIG. 9 is a perspective view of a corrugated web being cut in accordance with the present invention.

As shown in FIG. 8, the extruder 56 creates an uncut generally corrugated web 54 having a generally corrugated profile with continuous flattened peaks 58 and continuous flattened valleys 57 joined by continuous connecting portions 60, all extending in the direction of travel of the web 54 shown by arrows 19. As shown in FIGS. 8 and 9, the next step in the process is to cut portions of the uncut corrugated web 54 using upper and lower cutters 62, 64 which may or may not be heated. The drawings show cutters 62, 64 of one particular configuration. As shown in FIG. 9, arrows 41 are used to represent that the cutters 62, 64 may be heated. However, the cutters used in any of the processes of this invention may be other sizes, shapes or configurations and may be moved by any conventional means, such as a pneumatic power drive or any other driver (not shown).

As shown in FIG. 9, the group of upper cutters 62 may be joined together by one or more joiners 66 (one being shown in phantom in FIG. 9) and move together in the direction of arrows 67. In order to cut the generally flattened peaks 58 and the connecting portions 60 of the uncut corrugated web 54, the cutters 62 are moved downwardly, as shown in FIG. 9, a specific distance without cutting the generally flattened valleys 56 of the uncut corrugated web 54.

Similarly, as shown in FIG. 9, the group of lower cutters 64 may be joined together by one or more joiners 68 (one being shown in phantom in FIG. 9) and move together in the direction of arrows 69. In order to cut the generally flattened valleys 56 and the connecting portions 60 of the uncut corrugated web 54, the cutters 64 are moved upwardly, as shown in FIG. 9, a specific distance without cutting the generally flattened peaks 58 of the uncut corrugated web 54. Although the number and size of the cutters 62, 64 of FIGS. 8 and 9 do not equal one another, one skilled in the art may appreciate that any number of cutters of any desired size may be used in accordance with the present invention.

Figure 10:
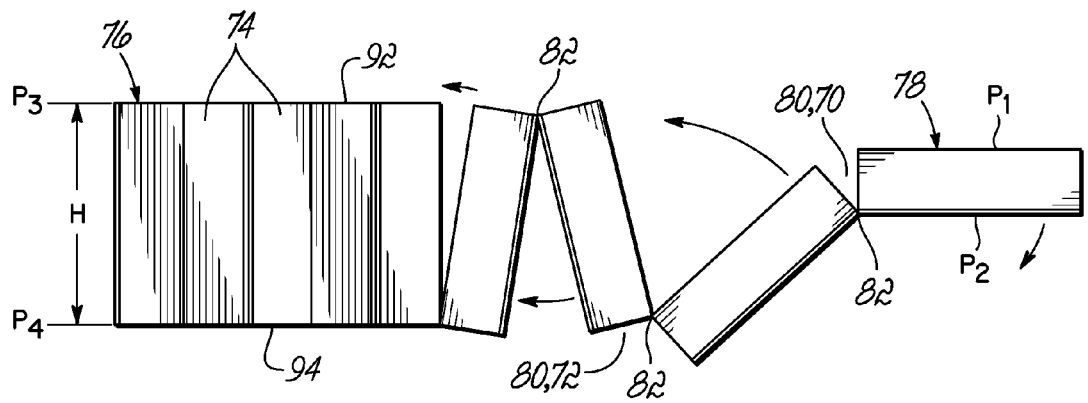
FIG. 10 is a side view of the corrugated web of FIG. 9 being folded into a honeycomb core.
Figure 11:
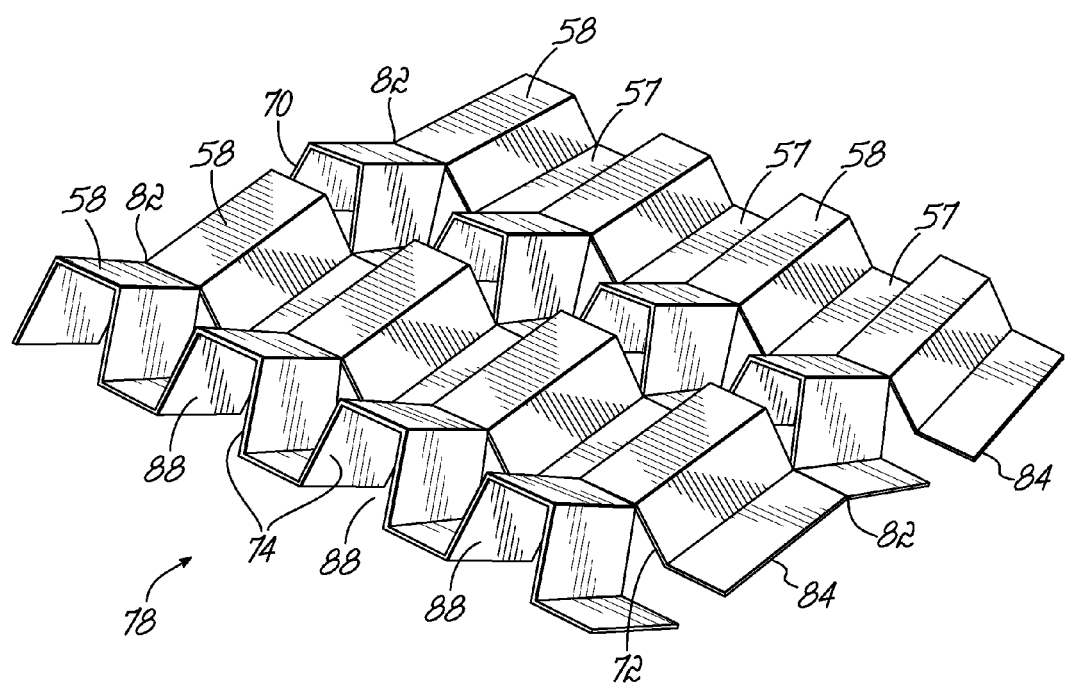
FIG. 11 is an enlarged perspective view of a portion of the cut corrugated web of FIG. 10.

The location of the cutters 62, 64 may be changed to change the distance between the upper cuts 70 made by the upper cutters 62 and the lower cuts 72 made by the lower cutters 64. The distance between adjacent cuts 70, 72 determines the height "H" of the cells 74 of the honeycomb core or layer 52 as shown in FIGS. 10 and 11. As a result of the cutting process shown in FIGS. 8 and 9, a continuous cut corrugated web 78 is formed.

As shown in FIG. 10, the next step in the process is to fold the continuous cut corrugated web 78 along scored portions 80 to create fold lines 82. Each fold line 82 is defined by a plurality of aligned, spaced upper cuts 70 or a plurality of spaced, aligned lower cuts 72 and spaced scored portions 80. If desired, the scored portions 80 may be omitted. Fold lines 82 extend transversely from one side edge 84 of the continuous cut corrugated web 78 to the opposing side edge 84 in a direction generally perpendicular to the direction of travel of the continuous cut corrugated web 78. As shown in FIG. 10, after being folded in an accordion fashion, the continuous cut corrugated web 78 shortens and becomes a continuous honeycomb core or layer 76. The folding step is disclosed schematically by the box 86 in FIGS. 8 and 12.

As shown in FIGS. 10 and 11, the fold lines 82 alternate between the upper and lower planes $P_1$ and $P_2$ of the continuous cut corrugated web 78. The honeycomb core 76 has a height H defined as the distance between the upper and lower planes $P_3$, $P_4$ of the honeycomb core 76 after the continuous cut corrugated web 78 has been folded, as shown in FIGS. 10 and 11. As shown in FIG. 11, each of the cells 74 of the honeycomb core 76 has a hollow interior 88. As shown in FIGS. 8 and 11, when the continuous cut corrugated web 78 is folded, the touching or contacting portions of the continuous peaks 58 and continuous valleys 57 may be joined together in any known manner.

As shown in FIG. 8, the next step in the process is applying or securing outer skins 90 to upper and lower surfaces 92, 94 of the continuous honeycomb core 76 in the direction of travel of the web 54. As shown in FIG. 8, this process described herein creates a continuous strip of material 95 having a sandwich-like or trilaminate composition, the outer skins 90 being outside and secured to the continuous interior layer 76. The continuous interior layer 76 comprises the honeycomb core made up of honeycomb cells 74, each having a hollow interior 88, which reduces the weight of the final product 96 without compromising the strength of the product 96.

Figure 12:
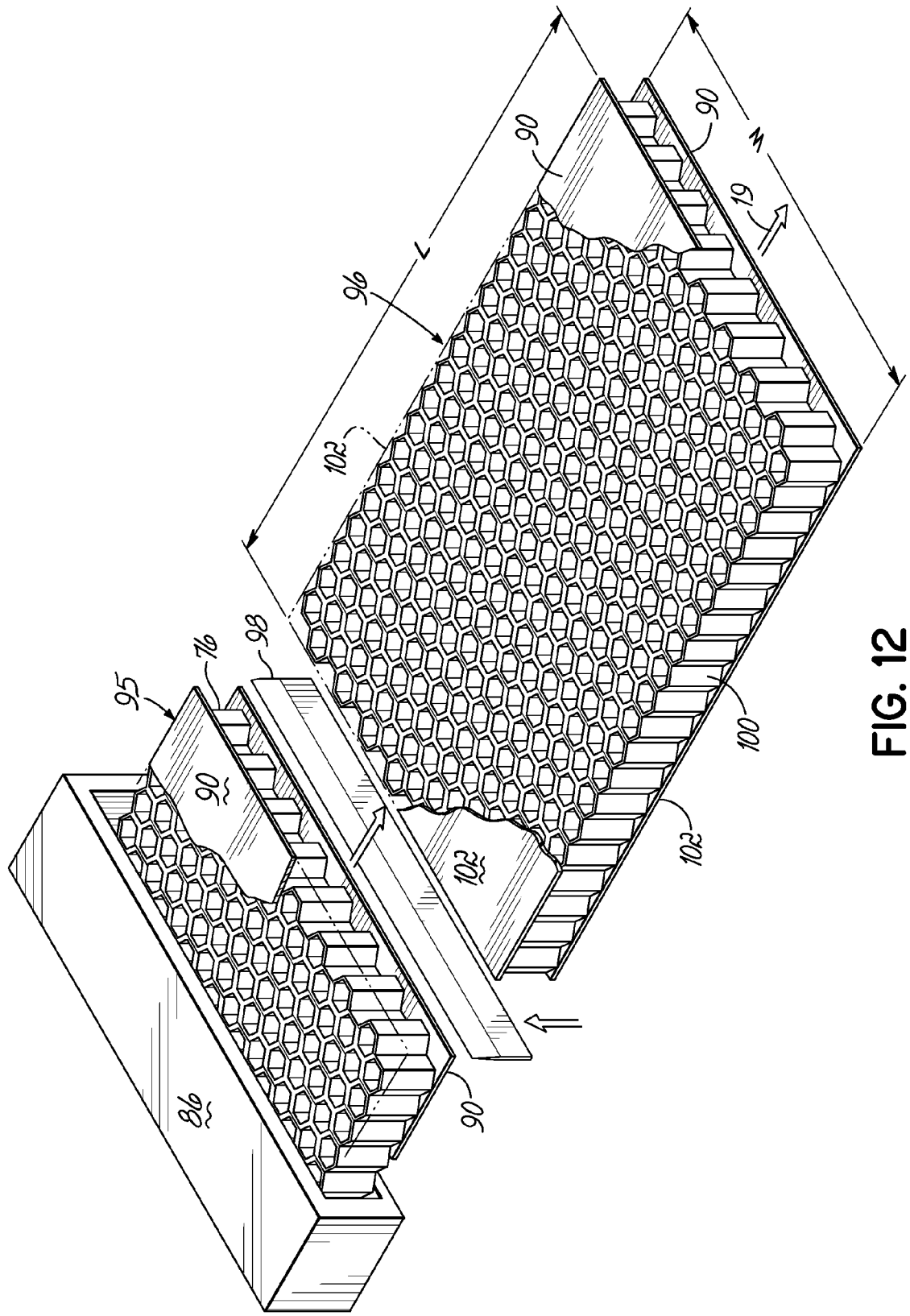
FIG. 12 is a perspective view of a continuous flow of multilayered product having a honeycomb core being cut to a desired size.

As illustrated in FIG. 12, the continuous multilayered material 95 may be cut to size via a cutter 98 to create a finished product 96 having a honeycomb interior layer. Although one size product 96 is illustrated in FIG. 12, the product 96 may be any desired size, i.e., length, width and/or height.

FIG. 8 shows two outer or protective skins 90 being placed over and under the continuous honeycomb core 76 to create a three-layered continuous product 95. The outer skins 90 may be applied from rolls of material (not shown), or may be supplied in any known manner. The cutter or cutting device 98 cuts the three-layered continuous product 95 to a desired size having a longitudinal dimension or length L in the direction of travel of the materials and a transverse dimension or width W perpendicular to the direction of travel of the materials, as shown in FIG. 12. The result is a finished product 96 having a honeycomb interior layer 100 and outer skins 102. This process enables the product 96 to weigh less than comparable products having a solid honeycomb core without compromising strength or integrity.

Figure 13:
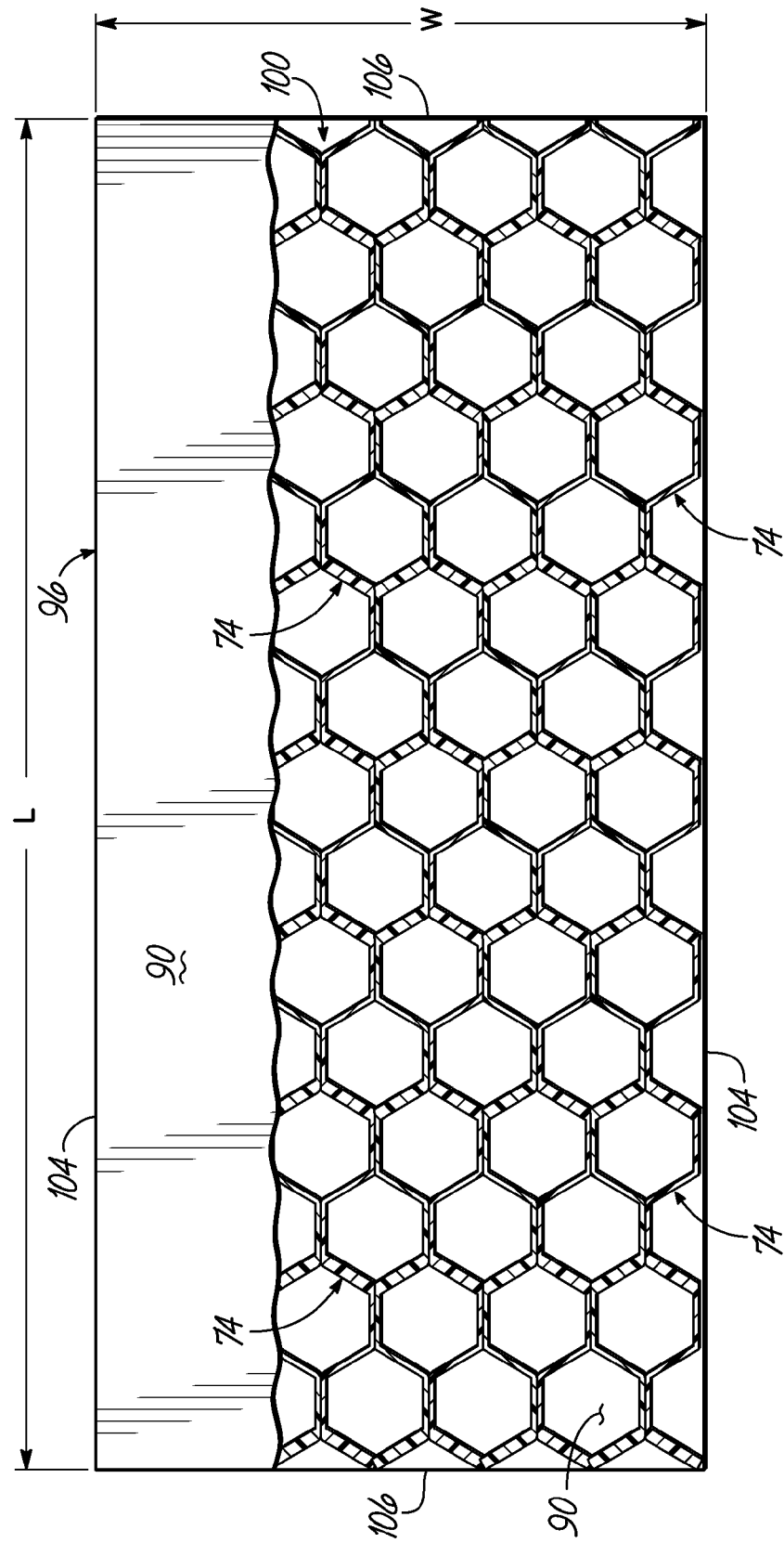
FIG. 13 is a top view, partially cut away, of the multi-layered product shown in FIG. 12.

FIG. 13 illustrates the finished multilayered product 96. Multilayered product 96 has a pair of opposed side edges 104, the distance between which defines the width "W" of the multilayered product 96. Similarly, multilayered product 96 has a pair of end edges 106, the distance between which defines the length "L" of the product 96. The multilayered product 96 has a middle layer or honeycomb core 100 covered on top and bottom with outer or protective skins or layers 90.

Referring to FIGS. 1, 7 and 7A, one of the results of having one of the connecting portions 60 of the extruded corrugated web 54 thicker than the peaks 58 and valleys 57 of the corrugated web 54 (shown in FIG. 7A) is that the strength of the honeycomb core 100 of product 96 shown in FIG. 13 is the same in the transverse (between opposed side edges 104) and longitudinal (between opposed end edges 106) directions. As shown in FIG. 7A, because the thickness "$T_3$" of alternative connecting portions 60 of the corrugated web 54 is approximately the same as the thickness of two peaks 58 or two valleys 56 of the corrugated web 54 contacting each other, after the process of manufacturing multilayered product 96 is complete, the strength of the honeycomb core 100 of product 96 is the same in both the transverse and longitudinal directions.

Figure 14:
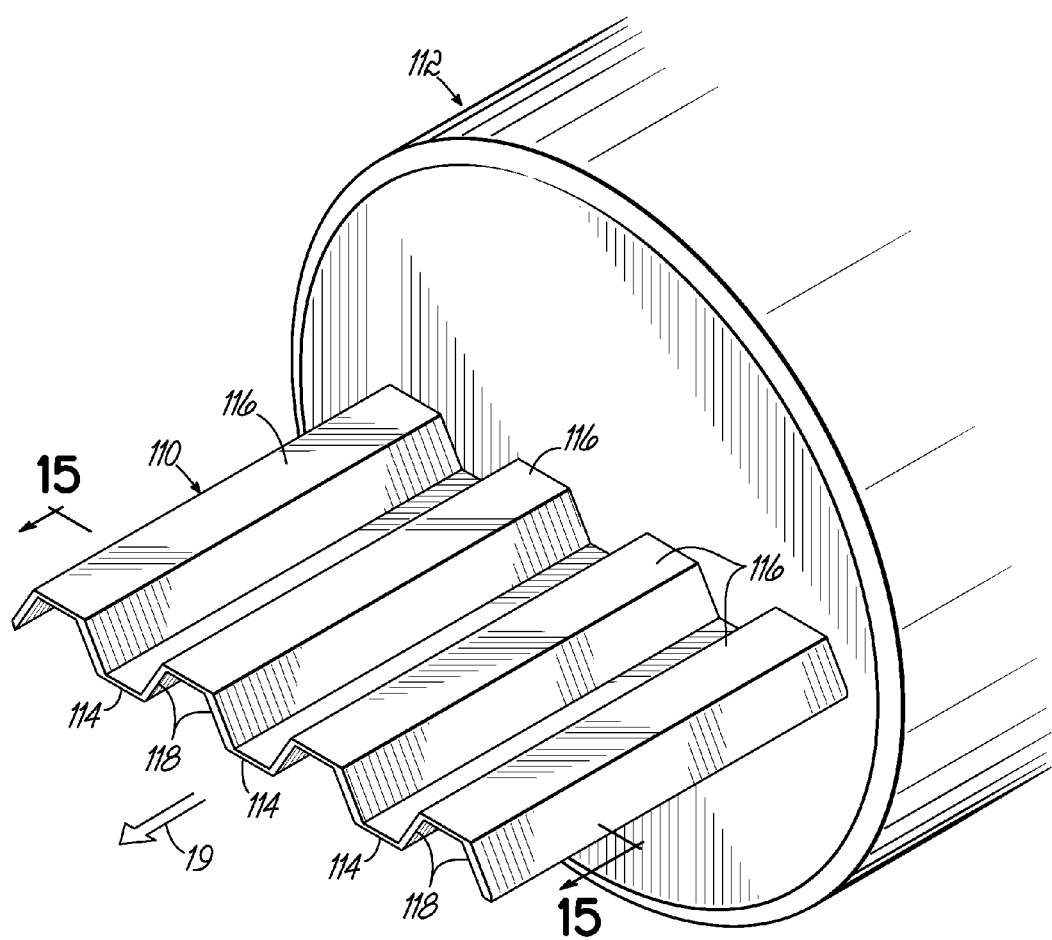
FIG. 14 is a perspective view of an extruder extruding a generally corrugated web for use in a honeycomb core.

FIGS. 14-16 illustrate another aspect of the invention. FIG. 14 illustrates a flexible, generally corrugated web of material 110 exiting an extruder 112. The flexible web of extruded material 110 is similar to, but not identical in configuration, as the continuous corrugated web 54 shown in FIG. 7. Both have continuous, as opposed to interrupted, corrugations. However, all of the connecting portions 118 of the continuous corrugations in the web 110 are thicker than the peaks and valleys, unlike in extruded corrugated web 54 shown in FIGS. 6, 7 and 7A. As shown in FIG. 15, extruder 112 is specifically configured to produce a generally corrugated web or extrudate 110 having continuous flattened valleys 114 and flattened peaks 116 of the same thickness "$T_4$" with each of the connecting portions 118 being of an increased thickness "$T_5$". The thickness "$T_5$" is greater than the thickness "$T_4$".

As shown in FIG. 14, the extruder 112 creates an uncut generally corrugated web 110 having a generally corrugated profile with continuous flattened peaks 116 and continuous flattened valleys 114 joined by continuous connecting portions 118, all extending in the direction of travel of the web 110 shown by arrow 19.

As shown in FIG. 16, the extruded corrugated web 110, after being cut and folded as described herein, has two outer skins 120 applied. FIG. 16 illustrates a finished multilayered product 122 made in accordance with this aspect of the invention (after the extruded corrugated web 110 has skins applied and is cut to a desired size). Multilayered product 122 has a pair of opposed side edges 124, the distance between which defines the width "W" of the multilayered product 122. Similarly, multilayered product 122 has a pair of end edges 126, the distance between which defines the length "L" of the product 122. The multilayered product 122 has a middle layer or honeycomb core 128 covered on top and bottom with outer or protective skins or layers 120.

One of the results of having each of the connecting portions 118 of the corrugated web 110 thicker than the peaks 116 and valleys 114 of the corrugated web 110 (shown in FIG. 15) is that the strength of the honeycomb core 128 of product 122 shown in FIG. 16 is the same in the transverse (between opposed side edges 124) and longitudinal (between opposed end edges 126) directions. As shown in FIG. 15, because the thickness "$T_5$" of each connecting portion 118 of the corrugated web 110 is approximately the same as the thickness of two peaks 116 or valleys 114 of the corrugated web 110 contacting each other, after the process of manufacturing multilayered product 122 is complete, the strength of the honeycomb core 128 of product 122 is the same in both the transverse and longitudinal directions.

Figure 17:
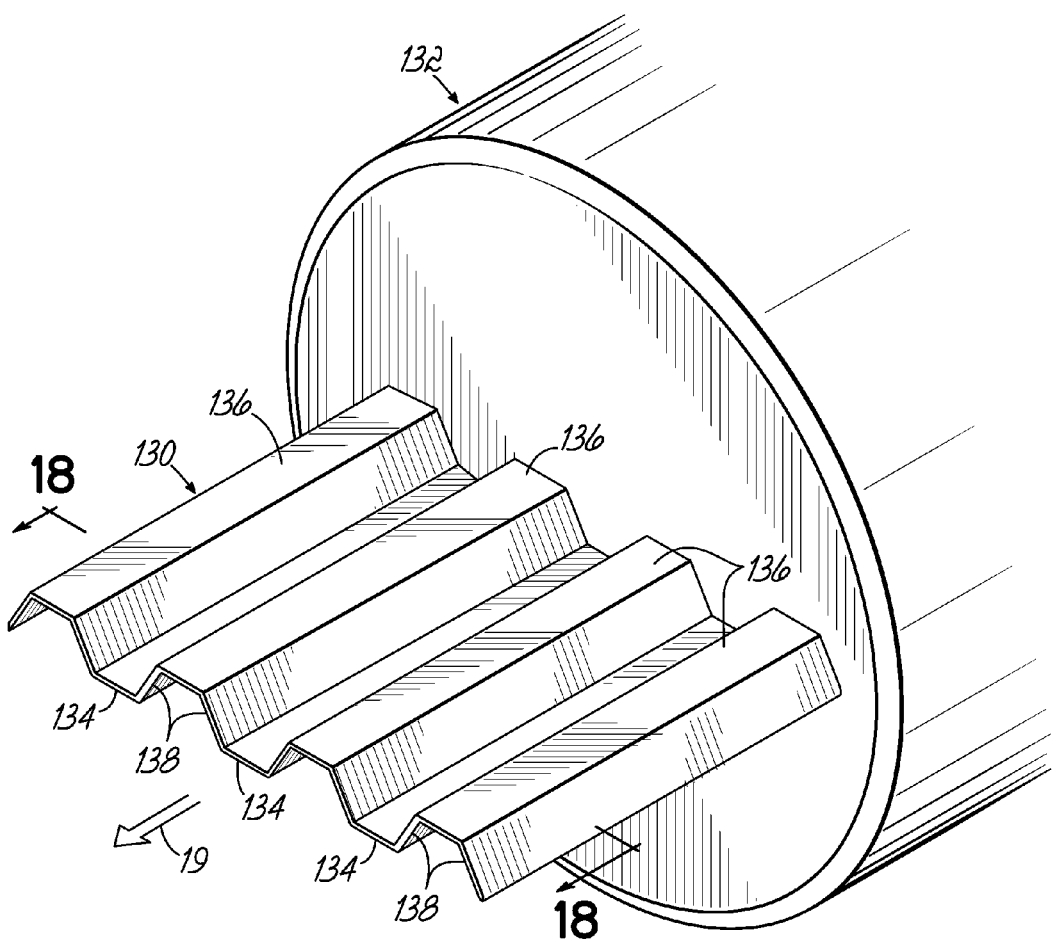
FIG. 17 is a perspective view of an extruder extruding a generally corrugated web for use in a honeycomb core.
Figure 18:
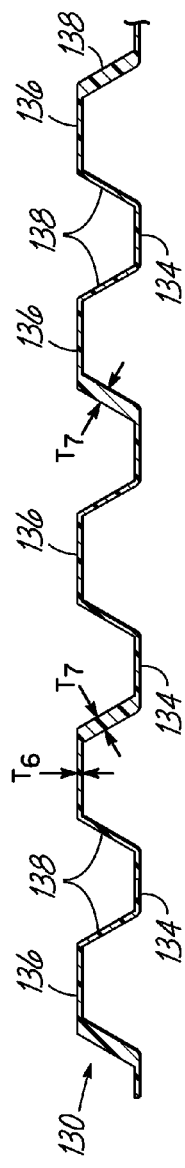
FIG. 18 is a cross-sectional view of an alternative configuration of web which may be formed using any of the methods described herein.
Figure 19:
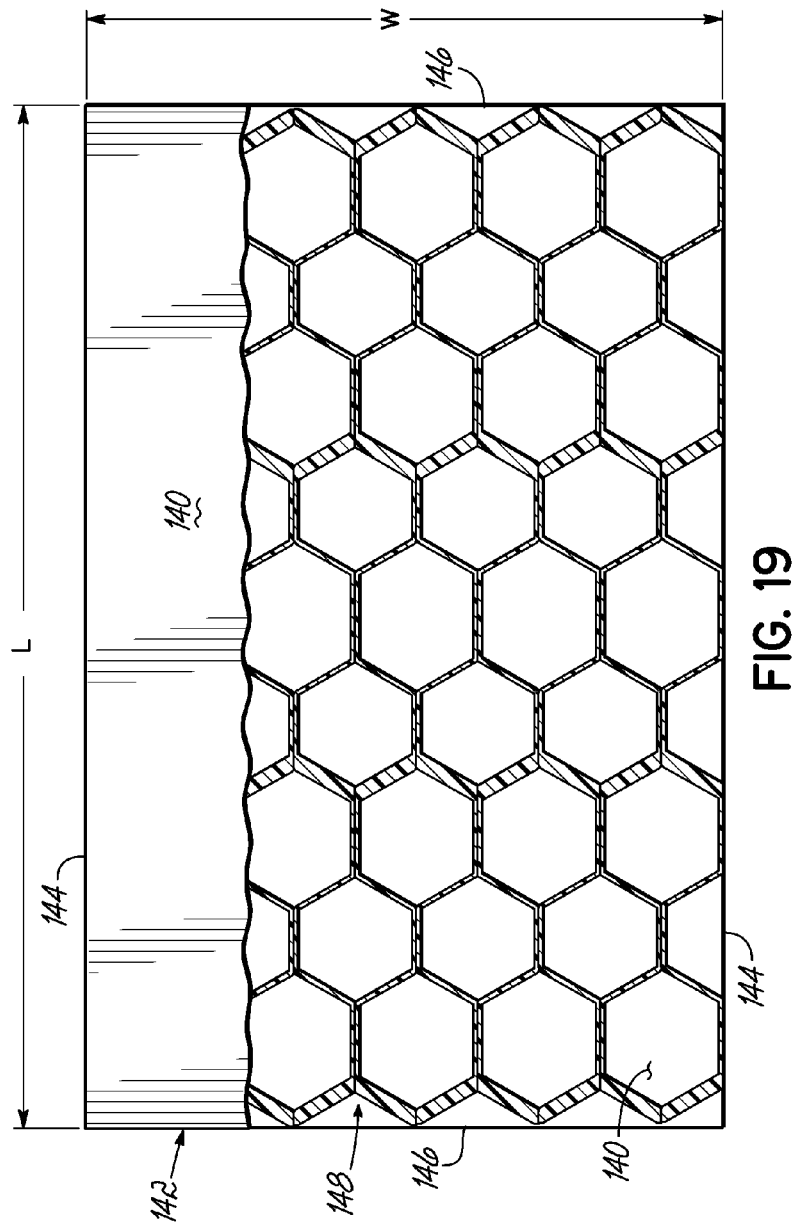
FIG. 19 is a top plan view of an alternative embodiment of product having a honeycomb core made from the web of FIG. 18.

FIGS. 17-19 illustrate another aspect of the present invention. FIG. 17 illustrates a flexible, generally corrugated web of material 130 exiting an extruder 132. The flexible web of extruded material 130 is similar to, but not identical, in configuration as the continuous corrugated web 54 shown in FIG. 7. Both have continuous, as opposed to interrupted, corrugations. However, every fourth connecting portion 138 of the continuous corrugations in the web 130 are thicker than the peaks 136 and valleys 134, unlike in extruded corrugated web 54 shown in FIGS. 6, 7 and 7A. As shown in FIG. 17, extruder 132 is specifically configured to produce a generally corrugated web or extrudate 130 having continuous flattened valleys 134 and flattened peaks 136 of the same thickness "$T_6$" with every fourth one of the connecting portions 138 being of an increased thickness "$T_7$". The thickness "$T_7$" is greater than the thickness "$T_6$".

As shown in FIG. 17, the extruder 132 creates an uncut generally corrugated web 130 having a generally corrugated profile with continuous flattened peaks 136 and continuous flattened valleys 134 joined by continuous connecting portions 138, all extending in the direction of travel of the web 130 shown by arrow 19.

As shown in FIG. 18, the extruded corrugated web 130, after being cut and folded as described herein, has two outer skins 140 applied. FIG. 18 illustrates a finished multilayered product 142 made in accordance with this aspect of the invention (after the extruded corrugated web 130 has skins applied and is cut to a desired size). Multilayered product 142 has a pair of opposed side edges 144, the distance between which defines the width "W" of the multilayered product 142. Similarly, multilayered product 142 has a pair of end edges 146, the distance between which defines the length "L" of the product 142. The multilayered product 142 has a middle layer or honeycomb core 148 covered on top and bottom with outer or protective skins or layers 140.

One of the results of having every fourth connecting portion 138 of the corrugated web 130 thicker than the peaks 136 and valleys 134 of the corrugated web 130 (shown in FIG. 17) is that the strength of the honeycomb core 148 of product 142 shown in FIG. 19 is the same in the transverse (between opposed side edges 144) and longitudinal (between opposed end edges 146) directions. As shown in FIG. 17, because the thickness "$T_7$" of every fourth connecting portion 138 of the corrugated web 110 is approximately the same as the thickness of two peaks 136 or valleys 134 of the corrugated web 130 contacting each other, after the process of manufacturing multilayered product 142 is complete, the strength of the honeycomb core 148 of product 142 is the same in both the transverse and longitudinal directions.

Figure 20:
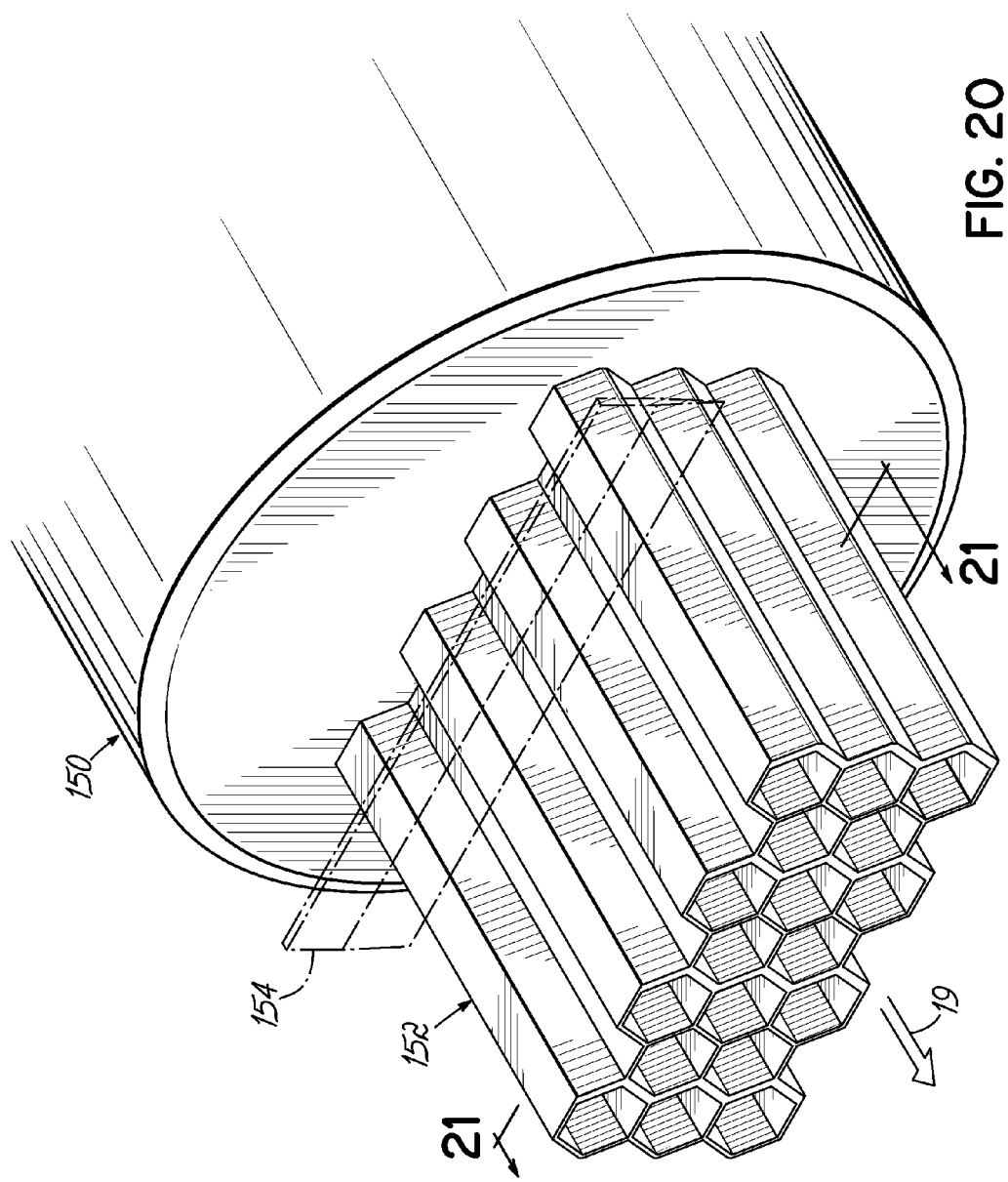
FIG. 20 is a perspective view of an extruder extruding an alternative honeycomb core for use in a multi-layered product.

FIG. 20 illustrates an extruder 150 which extrudes a continuous honeycomb core 152. The continuous honeycomb core 152 may assume any of the configurations described or shown herein. A cutter 154 is moved downwardly in the desired location to create a middle or interior honeycomb layer 156 of a multi-layered product 158 shown in FIG. 21. After the desired size, middle or interior honeycomb layer 156 is cut from continuous honeycomb core 152, outer skins 160 are applied as described above.

Figure 21:
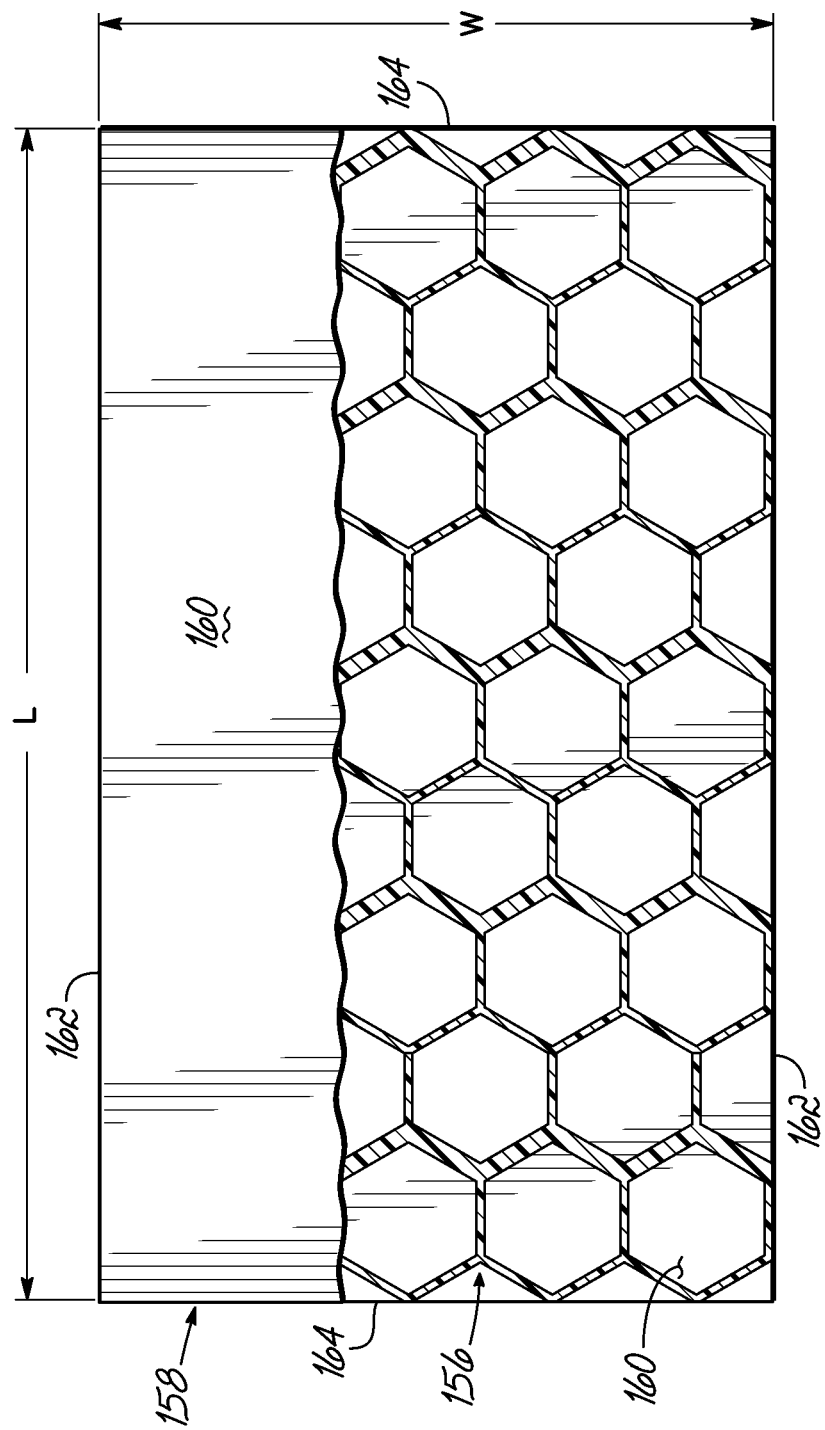
FIG. 21 is a top plan view of a product having a honeycomb core made via the process of FIG. 20.

FIG. 21 illustrates a finished multilayered product 158 made in accordance with this aspect of the invention (after the extruded and cut corrugated core 152 has skins applied). Multilayered product 158 has a pair of opposed side edges 162, the distance between which defines the width "W" of the multilayered product 158. Similarly, multilayered product 158 has a pair of end edges 164, the distance between which defines the length "L" of the product 158. The multilayered product 158 has a middle layer or honeycomb core 156 covered on top and bottom with outer or protective skins or layers 160.

While I have described several preferred embodiments of the present invention, persons skilled in the art will appreciate changes and modifications which may be made without departing from the spirit of the invention. For example, although one configuration of a cell is illustrated and described, the cells of the present invention may be other configurations, such as cylindrical in shape. Therefore, I intend to be limited only by the scope of the following claims and equivalents thereof.

I claim:

1. A process of making a multilayered product having a honeycomb layer comprising, in any desired order:
    moving a web of material in a first direction, said web of material having a cross-section of regions of varying thickness, the regions extending in the first direction;
    treating the web of material with a tool to produce a corrugated web of material having a corrugated profile with interrupted flattened peaks and flattened valleys joined by connecting portions of the web, said flattened peaks and flattened valleys extending in the direction of travel of the web;
    folding the corrugated web to create a honeycomb core; and
    applying outer skins to the honeycomb core.

2. The process of claim 1 wherein at least some of said connecting portions of the corrugated web have a thickness greater than the thickness of other of the connecting portions of the corrugated web.

3. The process of claim 1 wherein at least some of said connecting portions of the corrugated web have a thickness greater than the thickness of some of the peaks of the corrugated web.

4. The process of claim 1 wherein at least some of said connecting portions of the corrugated web have a thickness greater than the thickness of some of the valleys of the corrugated web.

5. The process of claim 1 wherein the web of material comes off a roll.

6. The process of claim 1 wherein the tool is movable.

7. The process of claim 1 wherein each of the connecting portions of the web has a thickness greater than at least one of the thickness of the flattened peaks and flattened valleys.

8. A process of making a multilayered product having a honeycomb core comprising, in any desired order:
    extruding a web of material in a first direction, the web having a corrugated profile with continuous flattened peaks and flattened valleys joined by connecting portions of the web, said continuous flattened peaks and flattened valleys extending in the direction of travel of the web;
    cutting the continuous corrugations of the corrugated web;
    folding the corrugated web to create a honeycomb core; and
    applying outer skins to the honeycomb core wherein at least some of said connecting portions of the corrugated web have a thickness greater than the thickness of other of the connecting portions of the corrugated web.

9. The process of claim 8 wherein the extruded web is plastic.

10. The process of claim 8 wherein the step of cutting the continuous corrugations of the corrugated web comprises contacting the corrugated web with two knives.

11. The process of claim 10 wherein the two knives move in opposite directions.

12. A process of making a multilayered product having a honeycomb core comprising, in any desired order:
    extruding a web of material in a first direction, the web having a corrugated profile with continuous flattened peaks and flattened valleys joined by connecting portions of the web, said continuous flattened peaks and flattened valleys extending in the direction of travel of the web;
    cutting portions of the corrugated web;
    folding the corrugated web to create a honeycomb core; and applying outer skins to the honeycomb core wherein at least some of said connecting portions of the corrugated web have a thickness greater than the thickness of some of the peaks of the corrugated web.

13. A process of making a multilayered product having a honeycomb core comprising, in any desired order:
   extruding a web of material in a first direction, the web having a corrugated profile with continuous flattened peaks and flattened valleys joined by connecting portions of the web, said flattened peaks and flattened valleys extending in the direction of travel of the web;
   cutting portions of the corrugated web;
   folding the corrugated web to create a honeycomb core; and
   applying outer skins to the honeycomb core wherein at least some of said connecting portions of the corrugated web have a thickness greater than the thickness of some of the valleys of the corrugated web.

14. A process of making a multilayered product having a honeycomb layer comprising, in any desired order:
   extruding a web of material to produce a corrugated web of material having continuous flattened peaks and flattened valleys joined by connecting portions of the web, said flattened peaks and flattened valleys extending in the direction of travel of the web;
   cutting portions of the corrugated web;
   folding the corrugated web to create a honeycomb core; and
   applying outer skins to the honeycomb core wherein at least some of said connecting portions of the corrugated web have a thickness greater than the thickness of other of the connecting portions of the corrugated web.

15. The process of claim 14 wherein the step of cutting portions of the corrugated web comprises contacting the corrugated web with two knives.

16. The process of claim 15 wherein the two knives move in opposite directions.

17. A process of making a multilayered product having a honeycomb layer comprising, in any desired order:
   extruding a web of material to produce a corrugated web of material having continuous flattened peaks and flattened valleys joined by connecting portions of the web, said flattened peaks and flattened valleys extending in the direction of travel of the web;
   cutting portions of the corrugated web;
   folding the corrugated web to create a honeycomb core; and
   applying outer skins to the honeycomb core wherein at least some of said connecting portions of the corrugated web have a thickness greater than the thickness of some of the peaks of the corrugated web.

18. The process of claim 17 wherein the step of cutting portions of the corrugated web comprises contacting the corrugated web with two knives.

19. The process of claim 18 wherein the two knives move in opposite directions.

20. A process of making a multilayered product having a honeycomb layer comprising, in any desired order:
   extruding a web of material to produce a corrugated web of material having continuous flattened peaks and flattened valleys joined by connecting portions of the web, said flattened peaks and flattened valleys extending in the direction of travel of the web;
   cutting portions of the corrugated web;
   folding the corrugated web to create a honeycomb core; and
   applying outer skins to the honeycomb core wherein at least some of said connecting portions of the corrugated web have a thickness greater than the thickness of some of the valleys of the corrugated web.

* * * * *